Jan. 15, 1963  P. GREGER ETAL  3,073,226
PHOTOGRAPHIC CAMERA WITH MEANS FOR SETTING A DIAPHRAGM
AUTOMATICALLY IN ACCORDANCE WITH A RANGE SETTING
Filed July 3, 1962  7 Sheets-Sheet 1
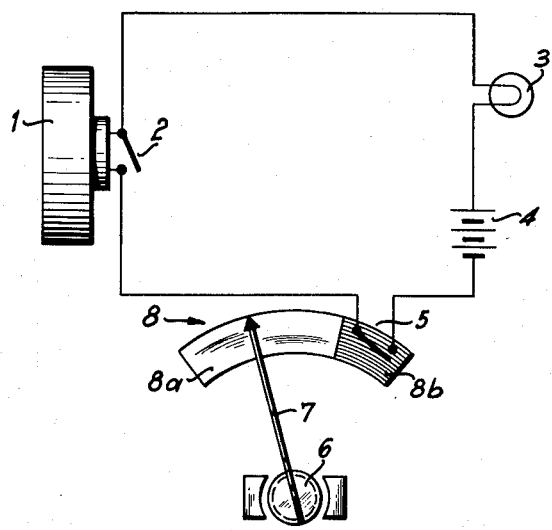
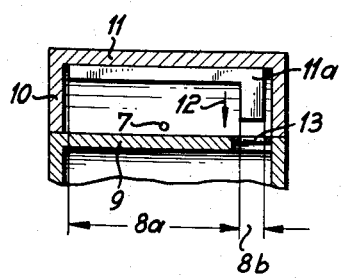
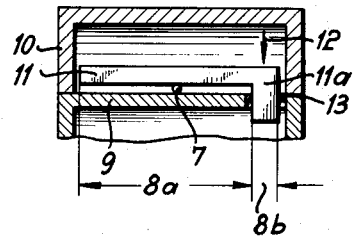
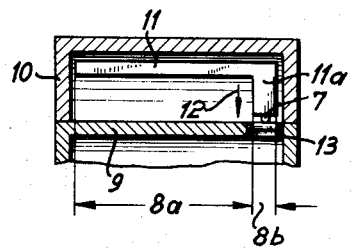

Jan. 15, 1963 P. GREGER ET AL 3,073,226
PHOTOGRAPHIC CAMERA WITH MEANS FOR SETTING A DIAPHRAGM
AUTOMATICALLY IN ACCORDANCE WITH A RANGE SETTING
Filed July 3, 1962 7 Sheets-Sheet 2

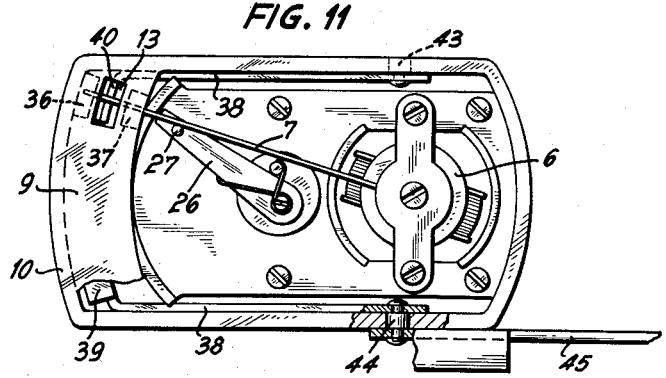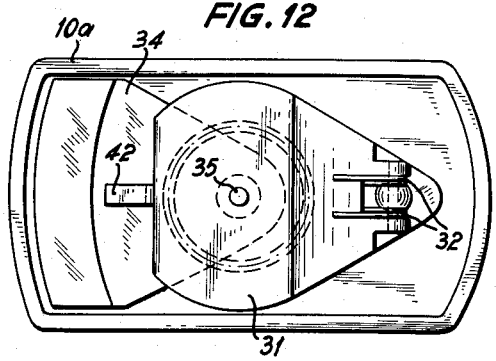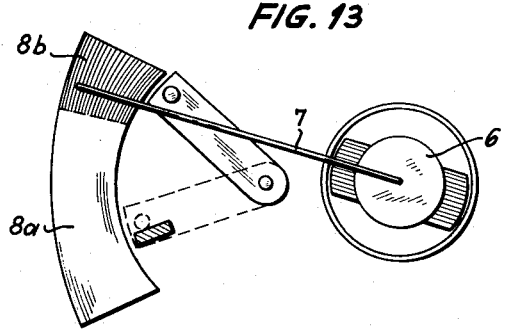

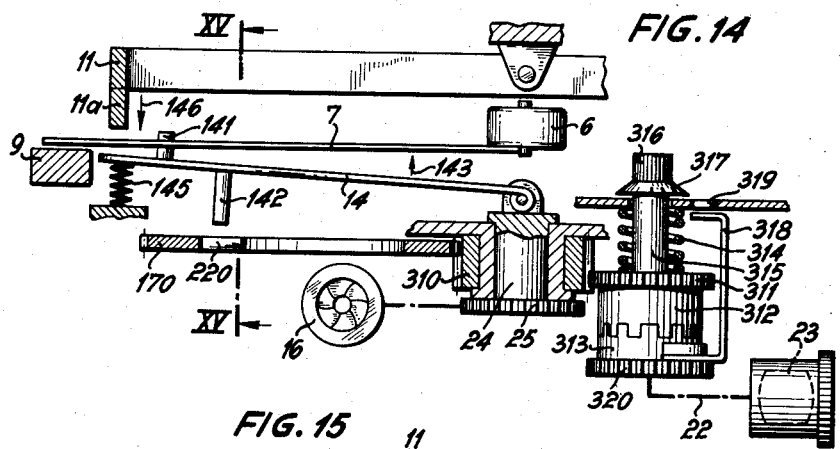
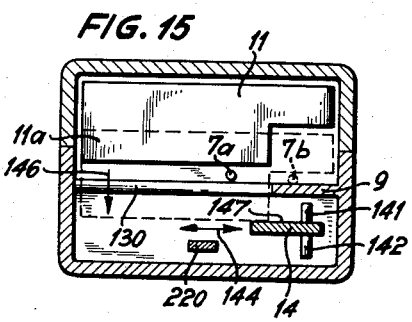
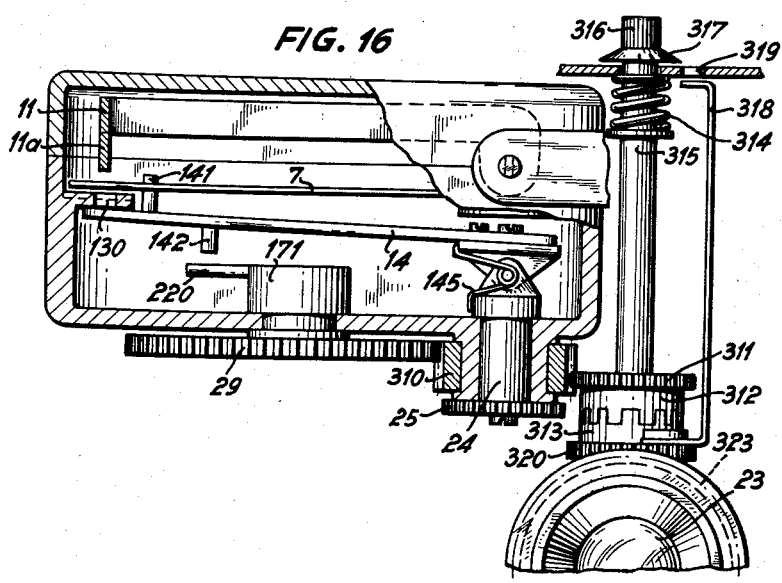

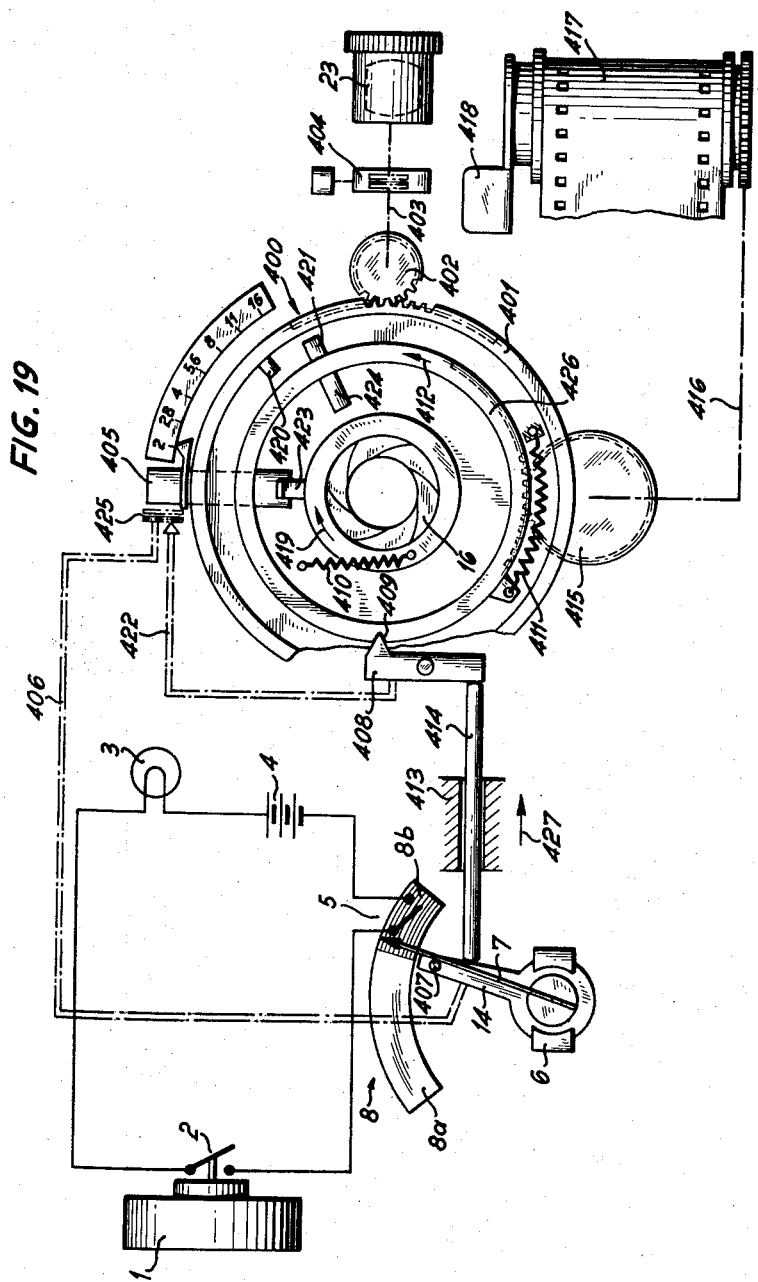

United States Patent Office 3,073,226
Patented Jan. 15, 1963

3,073,226
PHOTOGRAPHIC CAMERA WITH MEANS FOR SETTING A DIAPHRAGM AUTOMATICALLY IN ACCORDANCE WITH A RANGE SETTING
Paul Greger, Erwin Doring, and Richard Sommer, Braunschweig, Germany, assignors to Voigtlander A.G., Braunschweig, Germany, a corporation of Germany
Filed July 3, 1962, Ser. No. 207,343
Claims priority, application Germany July 11, 1961
16 Claims. (Cl. 95—10)

This invention relates to photographic cameras equipped with an exposure meter and having an auxiliary light source either permanently or disengageably coupled thereto, the exposure meter having a scale of ambient illumination values divided into a first range, wherein the ambient illumination is adequate for the range of possible time-diaphragm combinations of the camera, and a second and succeeding range of ambient illumination inadequate for the possible range of time-diaphragm combinations of the camera, and in which the diaphragm of the objective lens is automatically set, through the medium of a scanning device, in accordance with the indication of the exposure meter. More particularly, the present invention is directed to a camera of this type in which, when the exposure meter indicator is in such second range, the scanning device is coupled with the range or distance setting means of the objective lens so that the diaphragm then is set in accordance with the distance of the object to be photographed.

It has been proposed to provide a switching device in an energizing-circuit for the auxiliary light source and positioned in the scale range of inadequate ambient illumination, this switching device being arranged to be closed whenever the exposure meter indicator moves into such second range of inadequate ambient illumination. Such closure may be effected either directly by the indicator of the exposure meter, or by components controlled or functioning in coordination with the exposure meter indicator.

In a camera of the mentioned type, and prior to the release of the shutter, the diaphragm of the objective lens has been adjusted to an aperture size corresponding with the indication of the exposure meter. As the exposure meter indicator moves over the scale of the exposure meter through the range of adequate ambient illumination toward the range of inadequate ambient illumination, the diaphragm is moved in an opening direction and is fully opened directly before the indicator reaches the range of inadequate ambient illumination and remains fully open while the indicator is anywhere within that range. If, at that time, and with the switching device closed responsive to movement of the indicator into the range of inadequate illumination, the auxiliary light source were energized as a result of release of the shutter, overexposure may result.

Accordingly, varying distances of the object to be photographed must be taken into account by changing the diaphragm aperture, in the case of flashlight units, or additionally by changing the exposure time in the case of other auxiliary light sources with a more extended period of illumination. This presents the problem of how to coordinate the diaphragm or time-diaphragm combination setting as a function of the distance object, and of how to provide a coupling between the range or distance setting of the objective lens and the setting of the diaphragm, or of the time-diaphragm combination, with reference to a numerical index of the auxiliary light source.

In accordance with the present invention, this problem is solved by providing an arrangement wherein, when the exposure meter indicator is in the range of inadequate illumination, the scanning means for the indicator is coupled with a range setting of the objective lens, or alternatively by providing an arrangement wherein, when the exposure meter indicator is within the range of inadequate illumination, the scanning means effects a release of the diaphragm from a pre-set position to move to a pre-selected position which corresponds with the range setting of the objective lens.

One manner of accomplishing this is to provide a component coupled with the range setting means of the objective lens in such a manner, that when the exposure meter indicator is within the range of inadequate ambient illumination, this component will project into the path of travel of the scanning means so as to limit the travel of the scanning means to a position determined by the range setting of the objective lens rather than by the indication of the exposure meter. When the exposure meter indicator is in the range of adequate ambient illumination, this component is displaced out of the path of travel of the scanning means.

In a known manner, a clamping yoke can be provided in operative association with the exposure meter indicator and operating to lock the latter in position directly before it is scanned, this clamping yoke being operative responsive to initiation of operation of the shutter release. The clamping yoke can be provided with electrical contacts or electrical contact surfaces which, when the exposure meter indicator is within the range of inadequate ambient illumination, form part of the switching device in the energization circuit for the auxiliary light source.

In a particular embodiment of the invention, the exposure meter indicator moves relative to a clamping surface, against which it may be clamped by the clamping yoke so that it may be scanned by a scanning means or a re-set means while it is locked in position. In this case, that portion of the clamping surface which corresponds to the range of inadequate ambient illumination is designed as electrical contact means included in the energizing circuit of the additional auxiliary light source, which, in this case, is a flashlight device. If the electrically conductive exposure meter indicator is then locked when it is in the range of inadequate illumination, by operation of the clamping yoke, the energizing circuit of the auxiliary light source is closed to an extent that, upon operation of the shutter release, the standard flashlight device switch will complete the circuit to set off the flashlight device. Alternatively, the energizing circuit of a different type of auxiliary light source can be closed by such an arrangement, so that such light source will be activated upon locking of the indicator against the clamping surface.

Preferably, the clamping yoke is so designed that, when locking or clamping the exposure meter indicator in the range of inadequate ambient illumination, the clamping yoke has a stroke which is different from its stroke when it is locking the exposure meter indicator in the range of adequate ambient illumination. More particularly, the stroke of the clamping yoke, when locking the indicator in the range of inadequate ambient illumination, is much less than is the stroke of the clamping yoke when locking the indicator in the range of adequate ambient illumination. The scanning device blocking component, which is coupled to the range setting of the objective lens, may be so coupled with the binding yoke that, responsive to such shorter stroke of the clamping yoke, the component is in a position to limit travel of the scanning means and, when the clamping yoke has its longer stroke, the component is out of the path of travel of the scanning means. The scanning means can be arranged either to follow the exposure meter indicator, or to move counter to the movement of the exposure meter indicator.

In accordance with another embodiment of the present invention, the objective diaphragm may be of the type which is movable from any freely selected position into any pre-selected position in accordance with the indication of the exposure meter, and the position pre-selector of such a diaphragm may be coupled with the range setting means of the objective lens while a freely movable initial setting means for the diaphragm is coupled with the scanning means for the exposure meter indicator.

As a further feature of the present invention, the intensity of the light source can be regulated by cutting in and out of impedances, such as resistances or capacitances, in accordance with the position of the exposure meter indicator in the range of inadequate ambient illumination. The intensity of the light source can be regulated either directly by the exposure meter indicator or through the medium of resetting or scanning means operatively associated with the indicator.

For an understanding of the principles of the invention, reference is made to the following description of typical embodiment thereof as illustrated in the accompanying drawings. In the drawings:

FIG. 1 is a schematic wiring diagram which is illustrative of the electrical circuitry employed in the invention;

FIGS. 2, 3 and 4 are transverse sectional views through an exposure meter, incorporated in the camera, and illustrating three different positions of a clamping member or yoke for the exposure meter indicator;

FIG. 11 is a plan view, with upper parts removed, of the exposure meter shown in FIGS. 8, 9 and 10;

FIG. 12 is a bottom plan view of the removed upper part of the exposure meter;

FIG. 13 is a somewhat schematic partial plan view illustrating the cooperation between the exposure meter indicator and a scanning means, wherein the scanning means moves in a direction opposite to the direction of movement of the indicator with increasing ambient light;

FIG. 14 is a part schematic and part sectional view of the coupling between the scanning means and the range setting means of the objective lens utilizing the scanning arrangement shown schematically in FIG. 13;

FIG. 15 is a sectional view on the line XV—XV of FIG. 14;

FIG. 16 is an elevational view, partly in section, of a construction corresponding to the arrangement illustrated schematically in FIG. 14;

Figure 5:
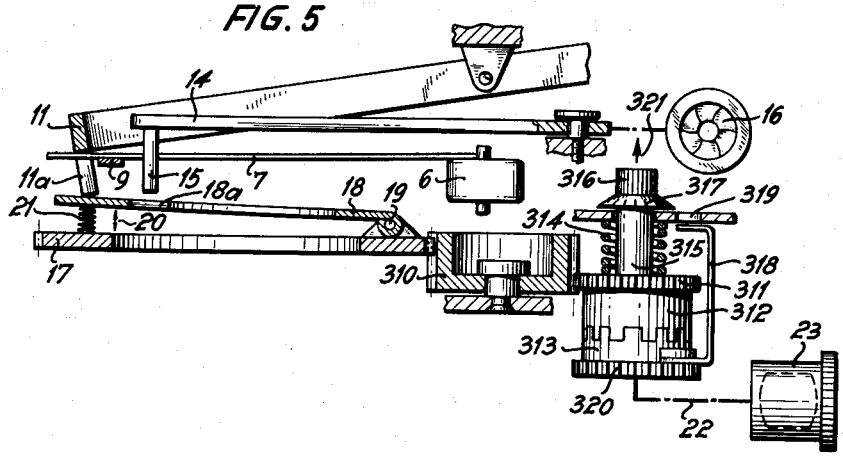
FIG. 5 is a part schematic and part sectional view illustrating an arrangement wherein the range setting means of the objective lens can be coupled with the scanning means for the exposure meter indicator and which, in turn, is coupled with the objective diaphragm, the exposure meter indicator being illustrated as locked in the range of adequate ambient illumination.

FIG. 19 is a somewhat schematic and diagrammatic illustration of an arrangement illustrating a pre-selector diaphragm which may be freely set to any position and which is movable to a pre-selected position on tripping of the shutter, and wherein the pre-selecting means of the diaphragm is coupled with the range setting means of the objective with the manually operable diaphragm setting means being coupled with the scanning means for the exposure meter indicator.

Referring to the wiring diagram of FIG. 1, the camera is provided with the shutter 1 which, when released, closes a normally open switch 2 which is included in series in the energizing circuit of an auxiliary light source 3 which may be, for example, a flashlight device although it may alternatively be an electronic auxiliary light source. A battery 4 is connected between light source 3 and one terminal of a normally open switch 5, and the other terminal of normally open switch 5 is connected to the normally open switch 2.

The camera is provided further with an exposure meter including a moving coil instrument 6 having an indicator 7 which is movable over a scale 8 indicating ambient illumination values. Scale 8 is divided into two consecutive ranges 8a and 8b. The first range 8a indicates ambient light values which are adequate for the range of possible time-diaphragm combinations of the camera, while the second range 8b indicates ambient light values which are inadequate for such range of possible time-diaphragm combinations of the camera. The switch device 5 is positioned within the range 8b of the scale 8 so that this switch device is closed whenever the indicator 7 moves into the range 8b. Such closure may be effected by direct engagement of the indicator with an operator of the switch device, or may be effected by elements or components associated with the indicator 7 such as, for example, a clamping member or a scanning or follow-up member. Furthermore, the switch device 5 may be incorporated directly in the energizing circuit of the auxiliary light source 3 or may be in the energizing circuit of a relay which controls energization of the light source.

Referring to FIGS. 2, 3 and 4, when a shutter release handle or operator is depressed, the indicator 7 is clamped in its indicating position in advance of the shutter release. To this end, the exposure meter housing 10 has mounted therein a clamping yoke 11 which is movable in the direction indicated by the arrow 12 to engage the indicator 7 to clamp the indicator against a clamping surface 9. When the indicator is so clamped, the position can be scanned by a scanning or a re-set device for automatic setting of the diaphragm or of the time-diaphragm combination in accordance with the reading of the exposure meter.

Yoke 11 is formed, or otherwise provided, with an abutment 11a which is positioned to extend in its direction of clamping movement and relative to the scale 8, through the range 8b of inadequate ambient illumination. Also, the clamping surface 9 is formed with an opening in the form of a slot 13 extending through the range 8b and over which the indicator 7 extends radially. FIG. 2 illustrates the parts in the position they occupy before actuation of the shutter release operator. It will be noted that, in FIGS. 2 and 3, the exposure meter indicator 7 is positioned within the range 8a of the scale 8, this range being the range of ambient light values adequate for possible diaphragm settings or time-diaphragm combinations of the camera.

Referring particularly to FIG. 3, when indicator 7 is in range 8a and the shutter release handle or operator is actuated, clamping yoke 11 moves in the direction of arrow 12 and abutment 11a passes through breach or slot 13 so that yoke 11 can clamp indicator 7 against the clamping surface 9. However, and as shown in FIG. 4, when indicator 7 is within range 8b, movement of yoke 11 in the direction of arrow 12 is limited by engagement of abutment 11a with indicator 7. Thus, in this case, the range of movement of yoke 11 is very substantially less than it is when indicator 7 is within range 8a of scale 8.

The surface portions of clamping surface 9 on either radial side of the recess 13 can be arranged as electrical contacts so that indicator 7, also arranged as an electrically conductive member, can directly complete the circuit exemplified by the switching device 5 in the schematic wiring diagram of FIG. 1. Thus, the switching device 5 is closed when indicator 7 is clamped in range 8b, and the diaphragm is then fully open for flashing.

Since generally flash exposures are confined to portraiture or group photos, this arrangement is adequate for photography with a simple camera equipped with objective lenses of slight luminous intensity. However, to assure a diaphragm and range or distance setting in accordance with the numerical index of the auxiliary light source, in the case of cameras with objective lenses having a higher illumination strength, a coupling between the diaphragm setting and the range setting is provided in accordance with the invention, and an example of such a coupling is shown schematically in FIGS. 5 through 7.

Figure 6:
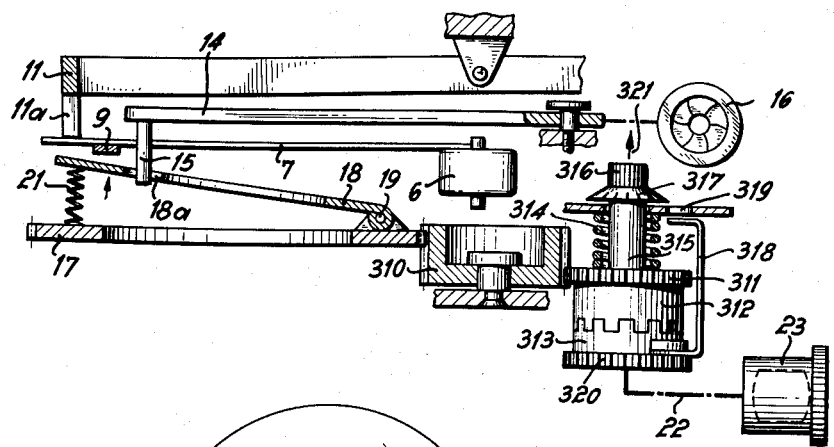
FIG. 6 is a view similar to FIG. 5 but showing the indicator locked within the range of inadequate illumination values.
Figure 7:
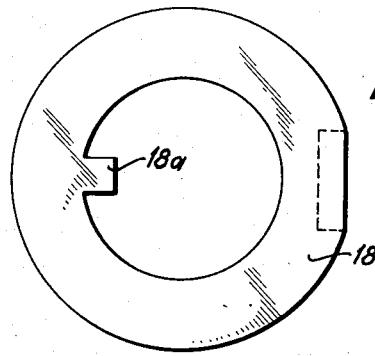
FIG. 7 is a plan view of a pivoted ring, constituting a component coupled with the range setting means of the objective lens and movable into the range of travel of the scanning means.

Referring to FIGS. 5 through 7, a re-set or scanning indicator 14 is functionally coordinated with exposure meter indicator 7, the scanning or re-set device 14 having a scanning projection 15 which is brought into engagement with the locked indicator 7 upon release of the shutter. Scanning or re-set device or indicator 14 is coupled with either the diaphragm or with both the shutter and the diaphragm of the camera, so that either the diaphragm or the time-diaphragm combination are set in accordance with the indication of the exposure meter. The diaphragm is illustrated schematically at 16.

Mounted beneath clamping yoke 11 and beneath the path of movement of indicator 7, including its deflection movement, there is an adjusting ring 17 on which is pivotally mounted a ring or equivalent member 18, ring 18 being pivoted on ring 17 by means of a bearing 19 and being movable relative to ring 17 as indicated by arrow 20. Adjusting ring 17 is coupled with the range setting means of the objective lens 23 by schematically illustrated gearing. A spring 21 biases ring 18 upwardly toward the abutment 11a of yoke 11.

When the parts occupy the position shown in FIG. 5, indicator 7 is in the range 8a of adequate ambient illumination and is locked in this position by means of clamping yoke 11. Abutment 11a then by-passes indicator 7 to project through recess 13 to engage ring 18 and press the latter toward ring 17. In this position of the parts, the scanning device 14 is movable throughout a range sufficient to engage its projection 15 with indicator 7 and thus set diaphragm 16, or the time-diaphragm combination, in accordance with the indication of the exposure meter.

In the position of the parts shown in FIG. 6, indicator 7 is in range 8b and is clamped in the manner shown in FIG. 4. Thus, abutment 11a of yoke 11 engages indicator 7 and is unable to move through the recess in surface 9, so that ring 18 remains biased away from the ring 17 by the spring 21. Ring 18, as best seen in FIG. 7, has its inner periphery provided with a lug 18a which, in the position of the parts shown in FIG. 6, is within the path of travel of the scanning projection 15 of scanning means 14 so as to engage projection 15. Thus, scanning means 14, 15 which, upon release of the shutter, is moved toward the position of indicator 7, is unable to engage the indicator 7 due to the limiting of the range of movement of the scanning means by abutment 18a of ring 18. As the position of ring 18, and of its lug 18a, is determined by the range setting of the objective lens 23, diaphragm 16, which is coupled with scanning means 14, 15 or controlled by the latter, is adjusted to a setting which is photometrically correct and which is a function of the range or distance setting of the objective.

Adjustment of the range setting means of objective lens 23 adjusts ring 17 along with ring 18. Thus, when indicator 7 is in the range 8b of inadequate ambient illumination, diaphragm 16 is set in accordance with the distance setting of objective lens 23, and with respect to the numerical index of the auxiliary light source, by means of scanning means 14, 15. On the other hand, if indicator 7 is in the range 8a of adequate ambient illumination, lug 11a of yoke 11 passes through clamping face 9 to engage ring 18 and press it toward ring 17 so that abutment means 18a is retracted from the path of movement of lug 15 and scanning indicator 14 is free to engage exposure meter indicator 7.

FIGS. 5 and 6 also show an arrangement whereby the numerical index of the auxiliary light source may be taken into consideration. An idler gear 310 meshes with ring 17 and with a pinion 311. Pinion 311 is fixed to move with element 312 of a disengageable clutch device including a second element 313. A spring 314 biases element 312 to interengage element 313. The shaft 315 of element 312 projects outside of housing 10 and has fixed thereto a setting knob 316 having a scale disk 317. An indicator 318 is secured to clutch element 313 and is visible through a window 319 in the housing. Element 313 has fixed thereto a pinion 320 which is coupled with the range setting means for objective lens 23 by means of the schematically illustrated gearing 22.

The numerical index setting or adjusting means functions in the following manner. To set the numerical index value, knob 316 is pulled upwardly in the direction of arrow 321 to disengage clutch elements 312 and 313. The knob then may be turned so as to place a particular graduation of scale 317 opposite the end of indicator 318, which is designed as a countermark. This indicator remains fixed when knob 316 is drawn upwardly. Pinion 311 of clutch element 312 remains engaged with the axially elongated idler gear 310, so that turning knob 316, after it has been pulled upwardly, adjusts setting ring 17 and pivoted ring 18. When knob 316 is released, spring 314 again biases upper element 312 into engagement with lower element 313. Upon subsequent adjustment of the range setting of objective lens 23, the diaphragm 16, when the exposure meter is in the range of inadequate ambient illumination, is set through the medium of gearing 22, clutch 312, 313, idler gear 310, ring 17, and ring 18 having the lug 18a cooperating with scanning means 14, 15. During such setting of the diaphragm, the indicator 313 remains fixed relative to the scale 317 on knob 316, so that the diaphragm setting takes into account the pre-adjustment for the numerical index of the light source. It will also be clear from FIG. 5 that, in the illustrative position of the parts, the knob 316 can be used to effect the range setting but, in this case, an additional distance or range scale would have to be provided on the knob and be adjustable with reference to a mark which is fixed relative to the housing.

Figure 8:
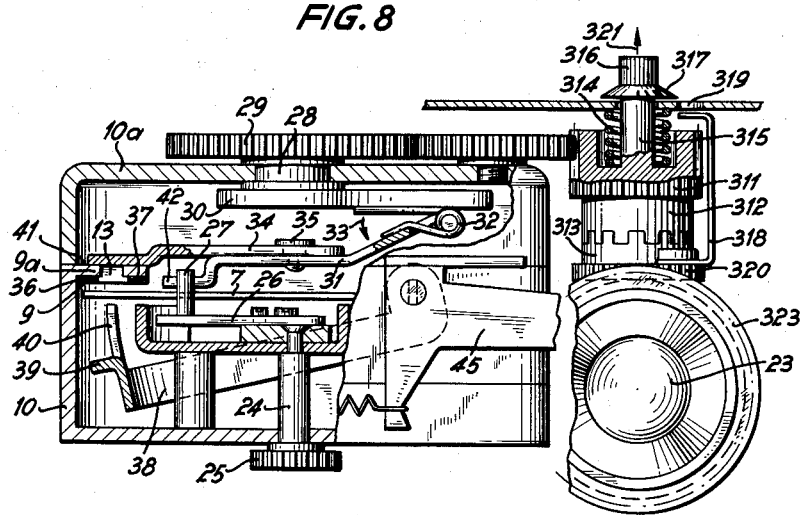
FIG. 8 is a side elevational view, partly in section, of a built-in exposure meter corresponding to the arrangements shown in FIGS. 5 and 6.
Figure 9:
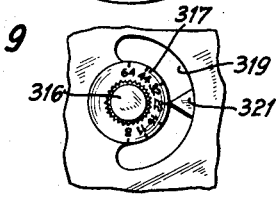
FIG. 9 is a partial plan view of the exposure meter, illustrating a setting knob and cooperating scale and mask means, for effecting and adjustment in accordance with the numerical index of the auxiliary light source.
Figure 10:
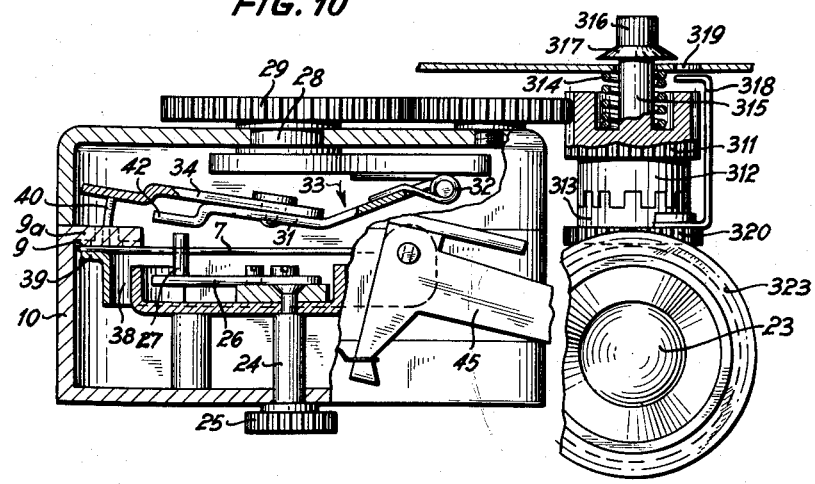
FIG. 10 is a view corresponding to FIG. 8 but showing the parts with the exposure meter indicator clamped in the range of adequate ambient illumination values.

Referring to FIGS. 8 through 10, which illustrate a practical embodiment of the arrangement shown schematically in FIGS. 5 and 6, FIG. 9 illustrates knob 316 with scale 317, tip 321 of indicator 321 appearing in the window 319 and serving for adjustment of knob 316 when the latter is pulled upwardly. In the illustrated arrangement, gear 320 of clutch element 313 is normal to a spur gear 323 of the range setting means of the objective 23 and meshes with gear 323.

A shaft 24 is rotatably mounted in the exposure meter housing 10 and a spur gear 25 is secured on the part thereof projecting beyond the housing. Spur gear 25 is coupled with the diaphragm setter, or with the setter for the time-diaphragm combination, by means of components which have not been illustrated. Secured to the other end of shaft 24 is a re-set or scanning indicator 26 having an upwardly extending scanning projection or lug 27. In the upper part or cover 10a of housing 10, there is a shaft 28 extending outside the housing and carrying a spur gear 29 on its outer end. Gear 29 is coupled through an idler gear, the already described setting means for the numerical index, with the range setter of the objective lens 23. Inside housing 10, a lever 30 is secured to shaft 28 and has a generally flat component 31 hinged thereto. A spring 32 biases component 31 in the direction of the arrow 33. Another substantially flat component 34 is secured to component 31 by means of a bolt 35 acting as a pivot for relative angular adjustment of components 31 and 34.

Indicator 7 travels over a clamping surface 9 of a flange 9a on exposure meter housing 10, and which has a breach 13 formed therein, as best seen in FIG. 8. The portions of surface 9a at the radial edges of breach 13 are covered by two electrical contacts 36 and 37. A clamping yoke 38 is swingably mounted in housing 10 and has an angular clamping face 39 and an upwardly projecting abutment 40. Abutment 40 is arcuately substantially coextensive with breach 13. If the indicator 7 is positioned in the sectional plane as shown in FIG. 8, abutment 40 will encounter the indicator 7 and press it against the two contacts 36 and 37 which are then electrically interconnected by the electrically conductive indicator 7.

Component 31 thus remains biased by spring 32 in the position illustrated in FIG. 8, component 34 is pressed against surface 41 of flange 9a, this being the surface on the opposite side of the flange from that carrying the contacts 36 and 37. As a result, a lug 42 carried by component 31 is positioned in the path of travel of scanning member 27 of scanning indicator 26, thus limiting the travel of the scanning indicator 26 relative to the exposure meter indicator 7.

FIG. 10 illustrates the position of the parts in a sectional plane corresponding to the range 8a of adequate values of ambient illumination. In the position of the parts shown in FIG. 10, indicator 7 is clamped by angular surface 39 of yoke 38 against clamping surface 9. Abutment 40 of yoke 38 passes through recess or breach 13 of surface 9 and engages component 34. Thereby, component 31 is moved in a direction against the bias of spring 32 and counter to the arrow 33. Lug 42 of component 31 thus is moved out of the path of travel of scanning member 27 of scanning indicator 26. With the indicator 7 positioned in the range 8a, upon actuation of the shutter release knob, scanning member 27 will engage indicator 7 so that the diaphragm will be set in accordance with the reading of the exposure meter.

FIG. 11 is a plan view of the exposure meter with the upper part 10a removed along with components 31 and 34 connected to such upper part. As seen in FIG. 11, exposure meter indicator 7 travels underneath the clamping face 9 of flange 9a of the housing 10, and with the end of indicator 7 overlapping breach 13 in clamping face 9. This prevents upward movement of abutment 40 of yoke 38. Yoke 38 is hinged by means of bolts 43 and 44 on both side walls of housing 10, and an external lever 45 coupled with the shutter release knob presses yoke 38 upwardly toward the clamping face 9. As also seen in FIG. 11, scanning projection 27 of scanning indicator 26 is arranged to engage either indicator 7 or lug 42 of component 31.

As previously explained, the diaphragm setting means, or the setting means for the time-diaphragm combination, is coupled with the scanning indicator by means of another gear which is not illustrated in FIG. 11. Referring again to FIG. 11, indicator 7 spans the two radially opposite surfaces of opening 13 and thus acts as a current bridge to close switch device 5. At the boundary position between the range of adequate ambient illumination and the range of inadequate ambient illumination, the diaphragm, which is initially open, is closed to a lower aperture value by virtue of the coupling with the range setting of the object lens, so that the diaphragm aperture is governed by this range setting. Nevertheless, in special instances overexposures are apt to occur in this boundary position because of the incidence of the additional light from the auxiliary light source. However, and generally speaking, such overexposures can be anticipated only where the distance ranges have been adjusted, inasmuch as the diaphragm is then wide open. In such instances, it is easier to make the additional light source effective. To prevent such exposure errors which are not too considerable per se, the contact faces 13 which are spanned by the indicator 7 can be arranged as a multiplicity of contiguous individual contact faces which selectively connect either resistances or capacitances in to the circuit of the auxiliary light source, or the contact faces can be devised as continuously wound resistances acting as voltage dividers and which are controlled, as to impedance effectively in the energizing circuit, by the exposure meter indicator.

FIG. 12 is a bottom plan view of the removed upper part 10a of the exposure meter housing, illustrating flat component 31 as well as lug 42 which is positionable within the path of movement of scanning member 27 of indicator 26.

In scanning the position of the indicator of an exposure meter by means of the scanning or re-set indicator, there are two different possibilities. Either the re-set indicator can follow the exposure meter indicator in its movement toward range 8b, or it can move in a direction opposite to the direction of movement of the exposure meter indicator. In the first case, the scanning device is so arranged that it effects shifting of the diaphragm from a closed position to an open position, with the deflection of the exposure meter indicator being generally greater under conditions of higher ambient illumination.

In the second case, the diaphragm must be coupled with the scanning indicator by means of a gear or the like in such a manner that the scanning indicator will cause the diaphragm to move from an open position toward a closed position. FIGS. 5 through 12 show arrangements wherein the scanning means moves counter to the direction of movement of the exposure meter toward higher ambient light values.

Figure 17:
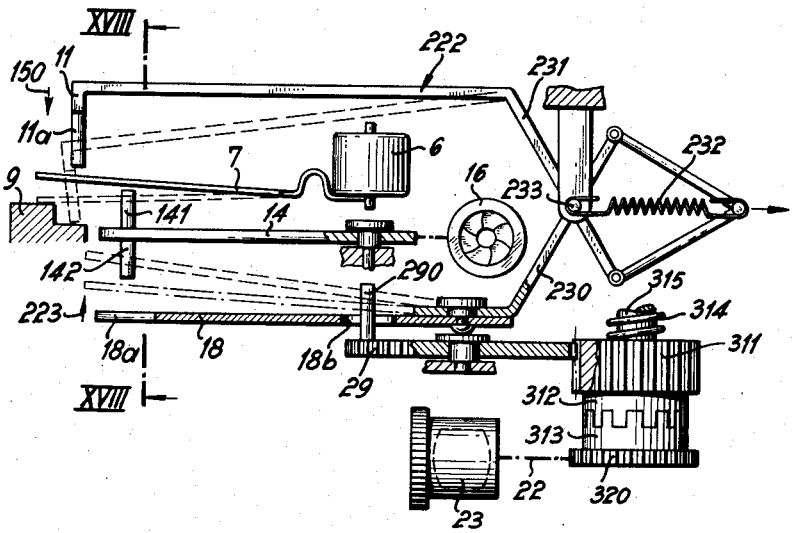
FIG. 17 is a part schematic and part sectional view illustrating another embodiment of the invention involving a coupling between a scanning means and the range setting means of the objective, and incorporating the scanning principle of FIG. 13.
Figure 18:
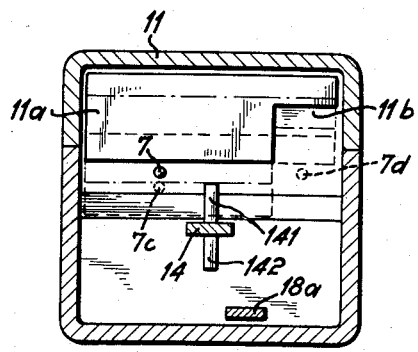
FIG. 18 is a sectional view on the line XVIII—XVIII of FIG. 17.

On the other hand, FIGS. 13 through 18 show arrangements wherein the scanning indicator follows the direction of movement of the exposure meter indicator with increasing ambient light. FIG. 13 illustrates schematically such an arrangement, whereas FIGS. 14 and 15 show somewhat diagrammatically one arrangement based upon the principle illustrated in FIG. 13, with FIG. 16 illustrating a practical embodiment of such an arrangement. FIGS. 17 and 18 show schematically a different type of arrangement.

In FIG. 14, the clamping yoke 11 has an abutment 11a located in the scale range of inadequate ambient illumination. Exposure meter indicator 7 moves over a clamping surface 9 inside the exposure meter housing, and is scanned by an indicator 14 which has an upwardly extending pin 41 and a downwardly extending pin 142. Pin 141 is arranged to be disposed in the path of travel of indicator 7, while pin 142 is movable into the path of travel of a lug 220 on a setting ring 170 rotatably mounted in the housing, lug 220 preferably being on the inner periphery of ring 170. In the same manner as previously described, setting ring 170 is coupled with the range setting means of object lens 23 through schematically illustrated gearing 22, gearing 22 further including an arrangement for taking into consideration the numerical index of the auxiliary light source, as has been previously described. In place of setting ring 170, a lever provided with a lug could be provided to accomplish the same function.

FIG. 15 illustrates two different positions of the clamping yoke. The broken lines illustrate the position of the clamping abutment 11a when indicator 7 is within the range of inadequate ambient illumination, and the solid lines illustrate the position of clamping yoke 11 when indicator 7 is within the range of adequate ambient illumination. FIG. 15 also shows the forward end of scanning indicator 14 with its pins 141 and 142, and lug 220.

Referring again to FIG. 14, scanning indicator 14 is so hinged to shaft or hub 24 that it may be moved both in the direction indicated by arrow 143 and in the opposite direction. Through hub 24 and gear 25, indicator 14 controls, in a known manner, an objective diaphragm 16 or means for the adjustment of the time-diaphragm combination. A spring 145 tends to force indicator 14 in the direction of the arrow 143 and toward the exposure meter indicator 7.

The illustrated arrangement operates in the following manner. Before the shutter is actually released, binding yoke 11 is moved, in a known manner, in the direction of arrow 146 toward exposure meter indicator 7. Contrary to the arrangement shown in FIGS. 5 through 12, if indicator 7 is positioned in the range of adequate ambient illumination, as if it is at position 7a of FIG. 15, it is engaged by lug 11a and forced against clamping surface 9. The stroke of clamping yoke 11 is thus limited to a value substantially below its maximum stroke due to the fact that indicator 7 prevents passage of abutment 11a through opening 130 in clamping surface 9. Thus, and as shown in FIG. 14, pin 141 remains in the field of travel of exposure meter indicator 7 so that scanning indicator 14 can engage indicator 7 to adjust diaphragm 16 in accordance with the indication of the exposure meter.

However, if indicator 7 is in the range of inadequate ambient illumination, as at the position 7b of FIG. 15, abutment 11a can pass through opening 130 in surface 9 in the direction of arrow 146, so that clamping yoke 11 can assume the broken line position of FIG. 15 and thus execute its full stroke. When this happens, indicator 7 is locked at position 7b and abutment or projection 11a engages the free end surface of indicator 14, which latter is wide enough so that, even when indicator 14 is in its extreme position, at least a marginal portion 147 thereof is still engageable by one edge of abutment 11a.

Abutment 11a therefore presses indicator 14 downwardly, compressing the spring 145, and pin 141 is retracted out of the field of travel of indicator 7, as shown in FIG. 15. At the same time, pin 142 moves into a path of travel which is intersected by the lug 220 of setting ring 170, so that movement of scanning member 14 is limited by the position of lug 220. Consequently, diaphragm 16 is set to a position determined by the numerical index of the auxiliary light source as adjusted through the coupling 312, 313.

FIG. 16 illustrates a practical construction of the arrangements shown schematically in FIGS. 14 and 15. Setting ring 170, in the construction shown in FIG. 16, is replaced by an equivalent journal or hub 171 provided with the lug 220 which projects into the path of travel of pin 142. Journal, hub, or bushing 171 is connected to a pinion 29 which is coupled with the range setting means of the objective lens 23 through an idler gear 310 and a numerical index coupling 312, 313. Shaft 24, which extends externally of the housing, hingedly mounts scanning indicator 14 on its inner end, and has a gear 125 secured to its outer end to adjust the objective diaphragm, which latter has not been illustrated.

Another arrangement of a scanning indicator arranged to scan the position of exposure meter indicator 7 is schematically illustrated in FIGS. 17 and 18. Indicator 7 again travels over a clamping surface 9 on the exposure meter housing, and scanning indicator 14 is provided with an upwardly extending pin 141 and a downwardly extending pin 142, the scanning indicator controlling the adjustment of objective diaphragm 16 by means of schematically illustrated gearing. The arrangement includes a clamping yoke 11, of which a front view is shown in FIG. 18. Clamping yoke 11, has abutment 11a extending through the range of adequate ambient illumination, and a recess or notch 11b extending through the range of inadequate ambient illumination.

The solid lines in FIG. 18 illustrate that position of clamping yoke 11 wherein the indicator 7 may move freely. The clamping positions of yoke 11 are shown by broken lines, both when indicator 7 is in the range of adequate ambient illumination and when it is within the range of inadequate ambient illumination.

Clamping yoke 11 is associated with a setting ring 18 having a lug 18a, this operative association including an arm 222 extending from lever 231 of a dual lever combination including levers 230 and 231. Setting ring 18 is mounted on lever 231, and levers 230 and 231 are pivotally interconnected intermediate their ends so that setting ring 18 moves in the direction of arrow 223 when clamping yoke 11 moves toward indicator 7. Stated another way, clamping yoke 11 and setting ring 18 conjointly move toward and away from each other, moving toward each other during the operation of clamping indicator 7 against surface 9. Clamping ring 18 is pivotally mounted on the lever 230 so that it may be swung by a pin 290 projecting into an elongated opening 18b in ring 18 and secured on a gear 29. Gear 29 is coupled with clutch device 312, 313 for setting or adjusting the parts with respect to the numerical index of the auxiliary light source, and the clutch device is connected to the range setting means of objective 23 through schematically illustrated gearing 22.

Levers 230 and 231 are hingedly interconnected at pivot 233, and a tension spring 232 serves to bias the levers to their initial position by swinging yoke 11 and setting ring 18 away from each other. In place of ring 18, there may be used a straight lever provided with a lug or the like.

If indicator 7 is positioned at point 7c of FIG. 18, which corresponds to a reading in the range of adequate ambient illumination, it is pressed against clamping surface 9, by abutment 11a, to lock indicator 7. Thereby, indicator 7 has a path of travel which is intersected by upwardly extending pin 141 of scanning indicator 14. While the setting ring 18 moves upwardly in the direction of arrow 223, it cannot move up far enough for lug 18a to be positioned in the path of travel of pin 142 of scanning indicator 14. Thus, in this position of the parts, the scanning indicator can move into the contact with exposure meter indicator 7 so that diaphragm 16 is adjusted in accordance with the reading of the exposure meter.

If indicator 7 is at the position 7d of FIG. 18, in the range of inadequate ambient illumination, when yoke 11 moves downward, indicator 7 will enter recess 11b of yoke 11. Consequently, yoke 11 can move downward, in the direction of the arrow 150 of FIG. 17, a much greater extent. Correspondingly, setting ring 18 can move further in a direction of arrow 223 of FIG. 17. In this position of the parts, lug 18a of setting ring 18 moves into the path of travel of pin 142 of scanning indicator 14. Consequently, in this latter position of the parts, the adjustment or position of scanning indicator 14 is controlled by setting ring 18 which is coupled with the range setting means of objective lens 23. Correspondingly, diaphragm 16 is thus adjusted in accordance with the pre-set numerical index of the auxiliary light source.

FIG. 19 illustrates another embodiment of the invention including a pre-selector diaphragm 400. Diaphragm 400 may be freely set at any initial position, and is moved into any other pre-selected position upon release of the shutter, through the actuation of a transmission means. A manually operable pre-selector 401 is connected with the range setting means of objective lens 23 through the medium of transmission components 402 and 403 as well as through a clutch device 404 which corresponds to elements 312, 313, and is arranged to pre-adjust the parts with respect to the numerical index of the auxiliary light source.

An initial position setter 405 for the diaphragm is coupled with scanning indicator 14 through transmission means schematically illustrated at 406. A releasable catch 408 is engaged in a notch 409 of a starting ring 426 which is biased by a spring 411 to rotate in a counterclock direction upon release of catch 408, this counterclockwise direction of rotation being indicated by the arrow 412. Catch 408 is coupled with a pin 414 longitudinally movable through a support 413 and projecting into the path of travel of scanning indicator 14 within the range 8b of inadequate ambient illumination. When the scanning indicator 14 is within this range, catch 408 is released from notch 409 so that ring 426 is biased by spring 411 to rotate in the direction of arrow 412. To restore the pre-selector diaphragm into its initial position, ring 426 is mechanically coupled with the winding means of the shutter, with the feed means 418 for film 417, or with similar means, this coupling means being effected by transmission means schematically illustrated at 415 and 416.

Pre-selector ring 401 has, on its inner periphery, a stop 420 which is arranged to engage a stop 421 on the outer periphery of ring 426. On the inner periphery of ring 426, there is a stop or abutment 424 which is arranged to engage a stop 423 of the initial diaphragm setter 405.

The diaphragm setter is biased clockwise by a spring 410, in the direction of the arrow 419, when the transmission coupling 425 in the transmission means 406 is ineffective. Spring 410 is weaker than spring 411. Coupling 425 is connected with pin 414 or with catch 403 through schematically illustrated transmission means 422. The interaction is effected in such a manner that, when pin 414 is moved in the direction of arrow 427, coupling 425 is engaged, and when pin 414 travels in the opposite direction, coupling 425 is disengaged.

The arrangement of FIG. 19 operates in the following manner. If indicator 7 is positioned in the range of adequate ambient illumination indicated at 8a, its scanned position is transmitted to the diaphragm in a known manner, as by means of scanning abutment 407 and the transmission elements 406, 425 and 405, diaphragm 16 is set in accordance with the reading of the exposure meter. Pre-selector ring 401, which is continuously coupled with the range setting means of objective 23, is set as a function of the range setting and independently of the position of scanning indicator 14.

If indicator 7 is positioned in the range of inadequate ambient illumination, indicated at 8b, scanning indicator 14 follows the exposure meter indicator 7 into this range. Through transmission means 406, diaphragm 16 is initially opened fully until scanning indicator 14 engages pin 414, or a corresponding gear component, to disengage catch 408 from notch 409 of ring 406. Ring 426 is then rotated by spring 411 through an angle sufficient for stop 421 to engage stop 420 of pre-selector ring 401 which latter has been set in accordance with the range setting of the objective lens. At the same time, coupling 425 is disengaged through transmission means 422 to disconnect gearing means 406 and diaphragm setter 405. Thereby, spring 410 is effective to move diaphragm setter 405 in the direction of arrow 419 to engage stop 423 with stop 424 of ring 426. Since spring 411 is stronger than spring 410, the diaphragm setter is at all times positioned as a function of the position of pre-selector ring 401.

When scanning member 14 is in the range 8b of inadequate ambient illumination, diaphragm 16 is thus automatically set at a value corresponding to the range setting of the objective lens, and in accordance with the numerical index of the auxiliary light source. Upon the return movement, scanning indicator 14 is restored to its initial position, while stop 424 of ring 426 disengages stop 423 of setter 405, so that diaphragm 16 has its aperture reduced to a minimum value by virtue of the bias of spring 410. In this position, coupling 425 is re-engaged. Thus, diaphragm setter 405 is again capable of being set, within the range of adequate ambient illumination, by means of the scanning indicator 14.

Pre-selector ring 401 can also serve as the range setting means of objective lens 23. This provides a particularly simple design, wherein the additional transmission means 402 and the numerical index coupling 404 may be eliminated. Adjustment in accordance with the numerical index of the auxiliary light source can be effected, in this arrangement, by having stop 420 on ring 401 mounted displaceably thereon so as to be moved to a given relative position in keeping with the numerical index. The same effect can be achieved by having stop 420 fixedly mounted on the pre-selector ring and by arranging stop 421 on ring 426 for relative displacement in accordance with the numerical index of the auxiliary light source. In the event that the flash unit or any other auxiliary light source is permanently connected to the camera, the numerical index coupling can be completely eliminated, since generally only a single numerical index is involved. A camera of this type would thus have a particularly simple construction.

While specific embodiments of the invention have been shown and described in detail to illustratae the application of the principles of the invention, it will be understood that the invention may be embodied otherwise without departing from such principles.

What is claimed is:

1. A photographic camera comprising, in combination, an auxiliary electric light source operatively associated with said camera; an exposure meter including an indicator movable relative to a scale having consecutive first and second ranges, the first range representing values of ambient light adequate within the range of possible time-exposure combinations of the camera, and the second range representing values of ambient light inadequate with the range of possible time-exposure combinations of the camera; an energizing circuit for said source; a normally open switch device in said circuit; means operable, responsive to movement of said indicator into said second scale range, to close such switch device; an objective; an objective diaphragm; range setting means for said objective; scanning means operable to scan the position of said indicator; means operable, in advance of said scanning, to lock said indicator in its indicating position; transmission means interconnecting said scanning means and said diaphragm to adjust the aperture of said diaphragm in accordance with the scanning position of said scanning means; and mechanism including said indicator, operable when said indicator is positioned within the range of inadequate ambient light values, to operatively associate said scanning means with said range setting means to restrict movement of said scanning means to a position corresponding to the range setting of said objective.

2. A photographic camera, as claimed in claim 1, including adjusting means connecting said mechanism to said range setting means and selectively operable to effect a relative adjustment of said mechanism and said range setting means in accordance with a numerical index of the light source.

3. A photographic camera, as claimed in claim 1, in which said mechanism includes a component coupled to said range setting means and movable in accordance with adjustment of the latter; cooperable abutment means on said scanning means and on said component; said scanning means and said component being relatively movable toward and away from each other in a direction substantially perpendicular to their planes of movement; and means operable, when said indicator is positioned in the range of inadequate ambient illumination values, to effect relative movement of said scanning means and said component toward each other to an extent such that said cooperable abutment means limit movement of said scanning means to the adjusted position of said component corresponding to the range setting of said objective.

4. A photographic camera, as claimed in claim 1, in which said mechanism includes a component coupled to said range setting means and movable in accordance with adjustment of the latter, said component being movable into the path of travel of said scanning means; means operable, when said indicator is within the range of inadequate ambient illumination, to effect movement of said component into the path of travel of said scanning means whereby to arrest movement of said scanning means at a position corresponding to the setting of said range setting means; and means operable, when said indicator is in the range of adequate ambient illumination, to displace said component out of the path of travel of said scanning means for adjustment of said diaphragm by said scanning means in accordance with the position of said indicator.

5. A photographic camera, as claimed in claim 1, in which said clamping means comprises a clamping yoke pivotally mounted for movement toward a position clamping said indicator against a clamping surface; said yoke having an abutment projecting therefrom in the direction of movement toward said indicator, and said abutment extending through the range of inadequate ambient light values whereby, when said indicator is in said latter range, said abutment will engage said indicator to limit movement of said yoke to a relatively small value; said abutment, when said indicator is in the range of adequate ambient illumination values, by-passing said indicator whereby said yoke will have a larger amplitude of movement in the clamping direction; said mechanism including a component coupled to said range setting means and movable in accordance with adjustment of the latter, said component having a lug projecting toward the path of travel of said scanning means; means biasing said component in a direction to position its lug within the path of travel of said scanning means; said clamping yoke abutment, during such larger amplitude of movement of said clamping yoke, engaging said component to move the latter in a direction to retract said lug from the path of movement of said scanning means; whereby, when said indicator is in the range of adequate ambient illumination values, said scanning means may scan said indicator for adjustment of said diaphragm in accordance with the reading of the exposure meter; and, when said indicator is in the range of inadequate ambient illumination values, said lug on said component remains in the path of travel of said scanning means; whereby adjustment of said diaphragm then is limited to a value corresponding to the setting of said range setting means.

6. A photographic camera, as claimed in claim 5, wherein said component comprises an annular member pivoted for movement substantially perpendicular to its general plane, said annular member having said lug extending inwardly from its inner periphery and positioned to engage a pin extending from said scanning means; said clamping yoke abutment being engageable with a portion of said annular member spaced from its pivot axis to swing the same in a direction to move its lug out of the path of movement of the pin carried by said scanning means.

7. A photographic camera, as claimed in claim 1, wherein said scanning means moves in a direction counter to the direction of movement of said indicator with increasing values of ambient illumination.

8. A photographic camera, as claimed in claim 1, wherein said scanning means moves in a direction corresponding to the direction of movement of said indicator with increasing values of ambient illumination.

9. A photographic camera, as claimed in claim 2, in which said mechanism comprises a rotatable ring and cooperable abutment means on said ring and on said scanning means; said adjusting means comprising a disengageable clutch device including a first element movable with said range setting means and a second element movable with said rotatable ring; means biasing said elements into engagement; manually operable means connected to one of said elements effective to separate said elements to disengage said clutch device; said manually operable means and the other element including cooperable scale means and indicia means related to numerical indices of electric light sources.

10. A photographic camera, as claimed in claim 9, said rotatable ring having a second ring hinged thereto for rotation therewith; said second ring having a lug projecting from its periphery; means biasing said second ring in a direction to position said lug in the path of travel of said scanning means; and means operable, when said indicator is within said first range of adequate ambient illumination values to displace said second ring toward said rotatable ring to move said lug out of the path of travel of said scanning means.

11. A photographic camera, as claimed in claim 1, in which said scanning means comprises a scanning indicator rotatable in a plane substantially parallel to the plane of movement of said exposure meter indicator and hinged, adjacent its pivotal mounting, for movement in a direction substantially normal to its plane of rotation; a first lug projecting from said scanning indicator into the path of travel of said exposure meter indicator; a second lug projecting from said scanning indicator into the path of travel of said exposure meter indicator; a second lug projecting from said scanning indicator in a direction opposite to said first lug; means biasing said scanning indicator in a direction to move said first lug into the path of movement of said exposure meter indicator; said mechanism including a component movable with said range setting means in accordance with the setting of the latter and formed with abutment means engageable with said second lug; said clamping means comprising a clamping yoke hingedly mounted for movement toward said exposure meter indicator and said scanning indicator to clamp said exposure meter indicator against a clamping surface; said yoke having an abutment on its free end extending through said first range and engageable with said exposure meter indicator when the latter is within said first range; said abutment, when said exposure meter is within said second range, bypassing said exposure meter to engage the free end of said scanning indicator to move the same in a direction to retract said first lug from the path of movement of said exposure meter indicator and to move said second lug into the path of movement of said abutment means on said component; whereby, when said exposure meter is in said range of adequate ambient illumination values, said diaphragm is set in accordance with the indication of said exposure meter and, when said exposure meter indicator is within the range of inadequate ambient illumination values, said diaphragm is set in accordance with the setting of said range setting means.

12. A photographic camera, as claimed in claim 1, including a pair of levers pivotally interconnected intermediate their ends for movement toward and away from each other, said levers being disposed on opposite sides of the plane of movement of said exposure meter indicator; means biasing said levers to move toward each other; said clamping means including a clamping yoke rigid with one of said levers for movement toward said exposure meter indicator to clamp the latter against a clamping surface, said clamping yoke having an abutment on its free end extending through the range of adequate ambient illumination values and engageable with said exposure meter indicator when the latter is within said range, said abutment clearing the exposure meter indicator and by-passing the same when the latter is in the range of inadequate ambient illumination values; said scanning means comprising a scanning indicator movable in a plane parallel substantially to the plane of movement of said exposure meter indicator, and having a first lug extending therefrom in a direction toward said clamping yoke and into the path of movement of said exposure meter indicator, and a second lug extending therefrom in a direction opposite to said first lug; said mechanism comprising a first component coupled to said range setting means and movable in accordance with the setting of the latter; said mechanism including a second component movable with the other lever and pivoted thereon for movement in a plane substantially perpendicular to the direction of movement of said clamping yoke, said second component having abutment means positionable in the path of movement of said second lug; means interengaging said first and second components for movement of said second component in accordance with movement of said first component; whereby, when said clamping yoke moves toward said exposure meter indicator, when the latter is in the range of adequate ambient illumination values, said second component will correspondingly move toward said scanning indicator but through a range of movement insufficient to move said abutment means into the path of travel of said second lug; said clamping yoke, upon movement toward said exposure meter indicator when the latter is in the range of inadequate ambient illumination values, having an amplitude of movement sufficient to move said second component toward said scanning indicator through a range of movement sufficient to position said abutment means in the path of movement of said second lug; whereby, when said exposure meter indicator is in the range of adequate ambient illumination values, said objective diaphragm is adjusted in accordance with the indication of said exposure meter and, when said exposure meter indicator is in the range of inadequate ambient illumination values, said objective diaphragm is adjusted in accordance with the setting of said range setting means.

13. A photographic camera, as claimed in claim 1, including impedance means controlled by said switch device and selectively connected into said energizing circuit by operation of the latter in accordance with the position of said indicator and in such a manner that the amount of impedance thus selectively connected into said energizing circuit is inversely proportional to the ambient illumination value indicated by said indicator when in said range of inadequate ambient illumination values.

14. A photographic camera, as claimed in claim 13, in which said impedance means comprise resistances.

15. A photographic camera, as claimed in claim 13, in which said impedance means comprise capacitances.

16. A photographic camera, as claimed in claim 1, wherein said objective diaphragm is a pre-selector diaphragm; initial setting means for said diaphragm; said scanning means being coupled to said setting means to set said diaphragm in accordance with the indication of said exposure meter; position pre-selector means operatively associated with said diaphragm; said mechanism including means coupling said pre-selector means to said range setting means for movement of said pre-selector means in accordance with the setting of said range setting means; means operable to bias said diaphragm to the position pre-selected by said pre-selector means; said mechanism including further means effective, when said indicator is in said second range of inadequate ambient illumination values, to release said diaphragm for movement to the position pre-selected by said preselector means whereby, when said indicator is in said second range of inadequate ambient illumination values, said diaphragm is adjusted to a position corresponding to the setting of said range setting means.

References Cited in the file of this patent

UNITED STATES PATENTS

| | | |
|---|---|---|
| 2,549,230 | Parody | Apr. 17, 1951 |
| 2,550,698 | King | May 1, 1951 |
| 2,978,970 | Fahlenberg | Apr. 11, 1961 |
| 2,993,422 | Rentschler | July 25, 1961 |
| 3,051,066 | Lareau | Aug. 28, 1962 |
| 3,054,337 | Nerwin | Sept. 18, 1962 |